United States Patent [19]
Kim

[11] Patent Number: 5,905,812
[45] Date of Patent: May 18, 1999

[54] PERCEPTUAL ERROR PROCESSING METHOD AND IMAGE CODING DEVICE USING THE SAME

[75] Inventor: Seong-jin Kim, Suwon, Rep. of Korea

[73] Assignee: Samsung Electronics Co., Ltd., Kyungki-do, Rep. of Korea

[21] Appl. No.: 08/850,504

[22] Filed: May 2, 1997

[30] Foreign Application Priority Data

May 2, 1996 [KR] Rep. of Korea ...................... 96-14244

[51] Int. Cl.$^6$ .................................................. G06K 9/30
[52] U.S. Cl. .......................................................... 382/236
[58] Field of Search ..................................... 382/232, 236, 382/238, 239, 240, 243, 245; 348/394, 398, 401, 409, 415, 420, 422

[56] References Cited

U.S. PATENT DOCUMENTS 5,072,290 12/1991 Yamagami et al. ........................ 358/13
5,552,832 9/1996 Astle ........................................ 348/420

OTHER PUBLICATIONS

Test Model 3, Draft Revision 1, Nov. 25, 1992, pp. 9, 21, 26–36, and 71–75.

*Primary Examiner*—Jose L. Couso
*Attorney, Agent, or Firm*—Foley & Lardner

[57] ABSTRACT

A perceptual error processing method and an image coding device using the same, which includes a generator for generating a predictive error image from the difference between an original image of a present frame to be coded and a restored image of a previous frame, a coder for coding the predictive error image through discrete cosine transform and quantization, a former for forming the coded predictive error image into a bitstream after performing variable length coding, a decoder for decoding the coded predictive error image through inverse quantization and inverse discrete cosine transform, a predictor for predicting the restored image of the previous frame by estimating and compensating a movement from the decoded predictive error image, and a perceptual error processor which reconstructs the predictive error image into a perceptual error image composed of only the predictive error generating the perceptual color difference by using a perceptual color difference look-up table and applies the same to the coder. Therefore, the coding efficiency of the image can be improved by enhancing the temporal and spatial correlation between the image data without causing deterioration of picture quality of the restored image by applying the human color perception to a conventional image coding method.

7 Claims, 4 Drawing Sheets

PERCEPTUAL ERROR PROCESSING METHOD AND IMAGE CODING DEVICE USING THE SAME

BACKGROUND OF THE INVENTION

The present invention relates to an image coding device, and more particularly, to a perceptual error processing method and an image coding device for improving image coding efficiency by enhancing an image data correlation by using human color perception in a temporal and spatial area.

A conventional image coding device improves coding efficiency by using the correlation with respect to the input image data and generally employs two coding methods as shown in FIG. 1. The first method is a transform coding method for defining the image data correlation in a spatial frequency area by transforming the image data to be coded from a temporal frequency area to the spatial frequency area using a discrete cosine transform (which is referred to as DCT, hereinafter). This coding method is used in an image compression and coding by extracting only the characteristic of the spatial frequency of the image data without loss of the image data, and more particularly, in the coding of a still image.

The second method is a predictive coding method by a differential pulse code modulation (which is referred to as DPCM, hereinafter). In this method, the amount of movements of the coding images are estimated using vector values by comparing an nth image (O) to be coded which is input from an image input portion 11 as shown in FIG. 1 with an (n−1)th image which was previously coded and estimates an amount of movement of the coded image unit using a vector value, to form a predictive image (P) of an original nth image to be coded using the estimated movement vector. The predictive image formed as above has an error due to the movement when compared with the actual original nth image. Such an error due to the movement is referred to as a predictive error (e) and expressed in the formula (1)

$$e = O - P \qquad (1)$$

The predictive error as defined above means the amount of the image data correlation in the temporal area. Using only the image data formed by this predictive error in the actual coding device causes loss of the image data but improves the efficiency of the image coding. Therefore, a hybrid coding method wherein the DCT method for extracting the spatial correlation between the image data and the DPCM method for extracting the temporal correlation between the image data are both applied is commonly used in the motion image coding method, as shown in FIG. 1.

SUMMARY OF THE INVENTION

An object of the invention is to improve the efficiency of coding by applying human color perception to such a method of extracting the correlation between the image data. For example, there exist plenty of indistinguishable predictive errors among the predictive error values gained through a DPCM process. Therefore, if such predictive errors can be removed by using the color perception, the efficiency of the coding can be improved by providing an identical picture quality of a restored image and relatively enhancing the correlation between the image data.

It is an object of the present invention to provide a perceptual error processing method which improves a temporal and spatial correlation between the image data by modeling the human color perception, forming a perceptual color difference look-up table so as to perform a real-time processing, and applying the same to the image data to be coded.

To achieve the object, there is provided a perceptual error processing method, comprising a perceptual color difference determination process for determining the sizes of allowable perceptual color differences to the respective image pixels of an original image to be coded by using a perceptual color difference look-up table. An error generation process defines a predictive error using standard pixel values of the respective coding image units in case of an intraframe and defines a predictive error using the difference between a predictive image which is predicted by estimating and compensating a movement, and the original image in case of an inter frame. A perceptual error determination process for determining a perceptual error image composed of only the error generates a perceptual color difference by comparing the sizes of allowable perceptual color differences of the respective image pixels determined in the perceptual color difference determination process with those of predictive errors of image pixels of the respective frame patterns generated in the error generation process.

It is another object of the present invention to provide an image coding device using the perceptual error processing method.

To achieve the object, there is provided an image coding device using the perceptual error processing method, comprising means for generating a predictive error image from the difference between an original image of a present frame to be coded and a restored image of a previous frame. Means are provided for coding the predictive error image through discrete cosine transform and quantization. There is also a means for forming the coded predictive error image into a bitstream after performing variable length coding, means for decoding the coded predictive error image through inverse quantization and inverse discrete cosine transform, and means for predicting the restored image of the previous frame by estimating and compensating a movement from the decoded predictive error image. A perceptual error processing portion reconstructs the predictive error image into a perceptual error image composed of only a predictive error which generates a perceptual color difference using a perceptual color difference look-up table and applies it to the coding means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention is described in detail with reference to the attached drawings.

Figure 1:
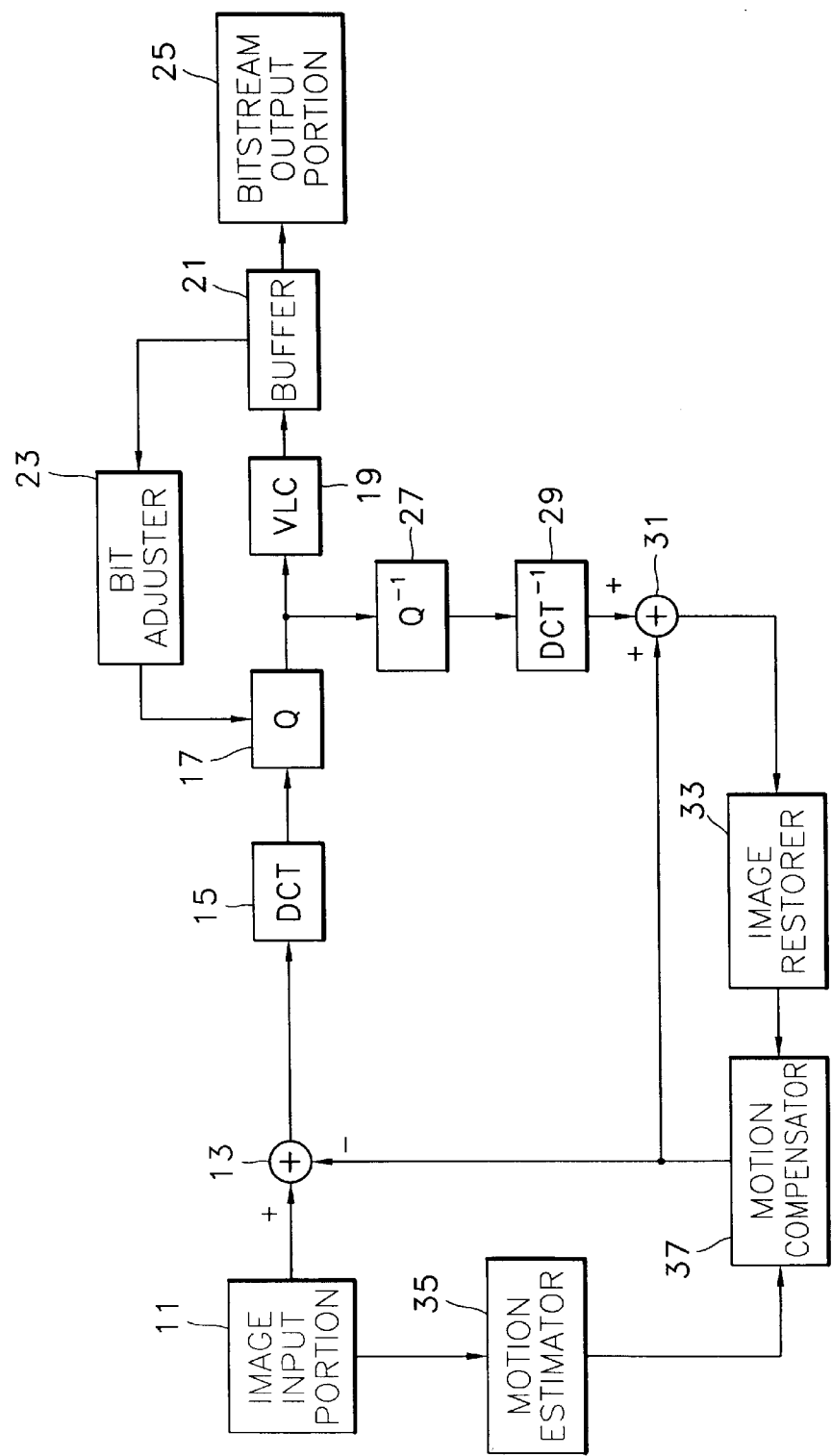
FIG. 1 is a block diagram showing a general image coding device.
Figure 2:
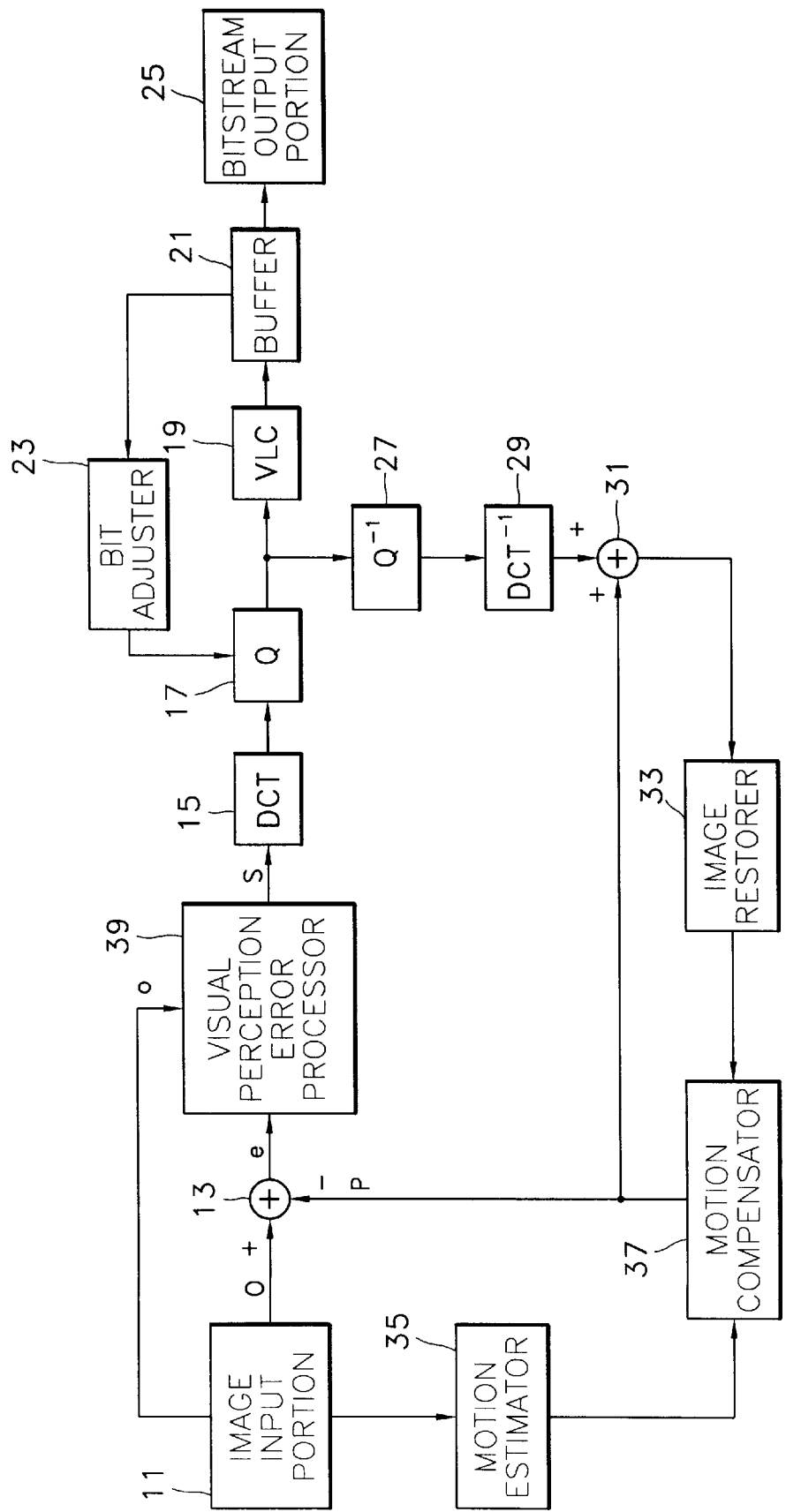
FIG. 2 is a block diagram showing an image coding device according to the present invention.

FIG. 2 is a block diagram showing an image coding device according to the present invention, which further comprises a perceptual error processing portion (also called a visual perception error precession) 39 in addition to the respective elements of FIG. 2. The image coding device of FIG. 2 includes an image input portion 11, a subtractor 13, a discrete cosine transformer (DCT) 15, a quantizer (Q) 17, a variable length coder (VLC) 19, a buffer 21, a bit controlling portion or bit adjustor 23, a bitstream output portion 25, an inverse quantizer 27, an inverse discrete cosine transformer 29, an adder 31, an image restoring portion 33, a movement estimating portion 35, a movement compensator portion 37, and a perceptual error processing portion an visual perception error processor 39.

Figure 4:
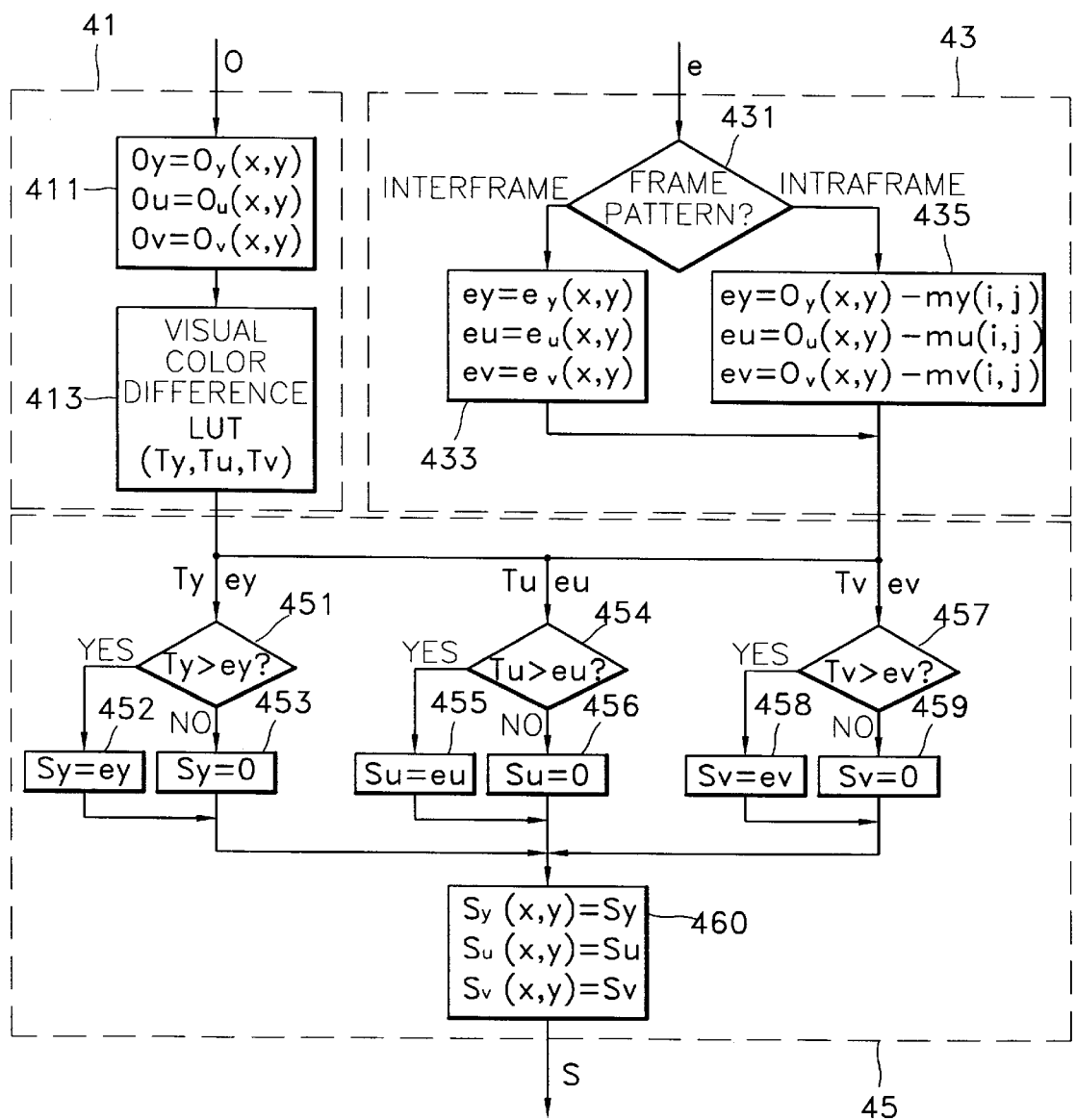
FIG. 4 is a flow chart describing an operation of a perceptual error processing portion according to the present invention.

FIG. 4 is a flow chart describing an operation of the perceptual error processing portion 39 according to the present invention, which comprises a perceptual color difference determination process (step 41) for determining the sizes Ty, Tu, and Tv of allowable perceptual color differences of the respective image pixels of an original image to be coded by using a perceptual color difference look-up table (LUT). Also included is an error generation process (step 43) for defining a predictive error (e) by using average pixel values (my(i,j), mu(i,j) and mv(i,j)) of the respective coding errors in case of an intraframe, and by a difference between a predictive image (P) formed via the movement estimating portion (35 in FIG. 2) and the movement compensating portion (37 in FIG. 2) and an original image (O) in case of an interframe. A perceptual error determination process (step 45) determines the perceptual error image composed of only the error which generates the perceptual color difference by comparing the sizes (Ty, Tu, and Tv) of the allowable perceptual color differences of the respective image pixels determined in the perceptual color difference determination process of step 41 with the sizes (ey, eu, and ev) of the predictive errors of the image pixels of the frame patterns generated in the error generation process of step 43.

Hereinafter, the operation and effect of the present invention is described with reference to FIGS. 2 through 5B.

In FIG. 2, the image input portion 11 and the subtractor 13 generate a predictive error image from the difference between an original image of the present frame to be coded and a restored image of the previous frame. The discrete cosine transformer 15 and the quantizer 17 code the predictive error image via discrete cosine transformation and quantization. The variable length coder 19, the buffer 21, the bit controlling portion or bit adjuster 23, and the bitstream output portion 25 perform the variable length coding on the coded predictive error image to be formed into a bitstream. The inverse quantizer 27 and the inverse discrete cosine transformer 29 decode the coded predictive error image via inverse quantization and inverse discrete cosine transform. The adder 31, the image restorer portion 33, the motion estimator 35, and motion compensator 37 predict the restored image of the previous frame by estimating and compensating the movement of the decoded predictive error image.

Also, the perception error processor 39 reconstructs the predictive error image into the perceptual error image composed of only the error which generates the perceptual color difference using the perceptual color difference look-up table and applies it to the coding means 15 and 17.

In FIG. 4, the perceptual color difference look-up table is used in determining (step 413) the sizes (Ty, Tu, and Tv) of the allowable perceptual color differences with respect to the respective image pixels (Oy=Oy(x,y), Ou=Ou(x,y) and Ov=Ov(x,y) after receiving (step 411) the digital original image (O) composed of the YUV color values in the process (step 41) of determining the perceptual color difference.

Figure 3:
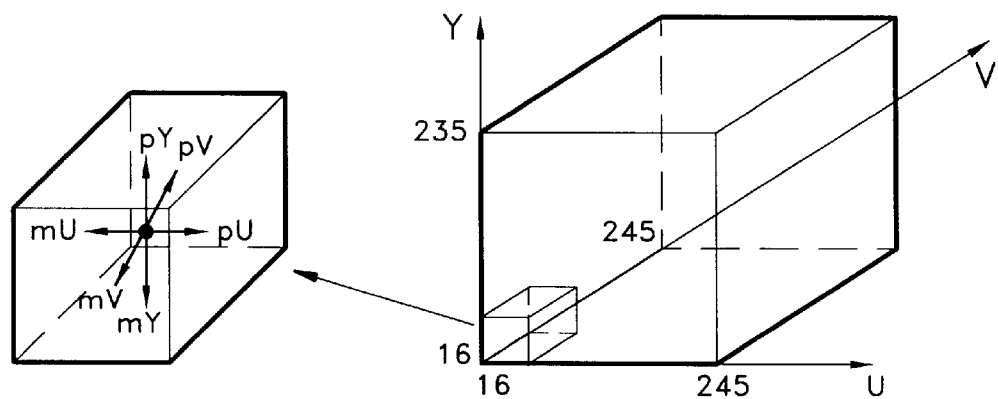
FIG. 3 is a view used to describe a method of forming a perceptual color differences look-up table which is used in the present invention.

The perceptual color difference look-up table used in the perceptual error processing portion (39 in FIG. 2) is composed as shown in FIG. 3 by determining the sizes of the allowable perceptual color differences of the respective color components (L, a and b) in the CIE L*a*b* uniform perceptual color coordinate system by applying the formula of the perceptual color difference designated by the Color Measurement Committee (which is referred to as CMC) which is defined by the following formula (2) and converting the sizes of the allowable visual perception color differences defined in the CIE L*a*b* color coordinate system into a YUV color coordinated system, to form the FIG. 3 coordinate.

$$S_L = \text{if } L < 16, \quad 0.511 \quad (2)$$
$$\text{else,} \quad 0.040975L/(1+0.01765L)$$

$$S_c = 0.0638C/(1+0.00131C) + 0.638$$

$$S_H = S_C(T \cdot F + 1 - F)$$

$$F = [C^4/(C^4 + 1900)]^{1/2}$$

$$F = \text{if } 164° \le h \le 345°, \quad 0.56 + |0.2\cos(h+168)|$$
$$\text{else,} \quad 0.36 + |0.4\cos(h+168)|$$

$$CMC(l; c) = \sqrt{(\Delta L/lS_L)^2 + (\Delta C/cS_C)^2 + (\Delta H/S_H)^2}$$

A method of defining the sizes (Ty, Tu, and Tv) of the allowable perceptual color differences in the perceptual color difference look-up table according to the color values (Oy, Ou and Ov) of the input original image pixels is shown in the formulas (3) and (4).

$$\text{index} = (Oy/32)*64 + (Ou/32)*8 + (Ov/32) \quad (3)$$

$$Ty = LUT[\text{index}][0]$$

$$Tu = LUT[\text{index}][2]$$

$$Tv = LUT[\text{index}][4] \quad (4)$$

The above formula (4) defines Tu and Tv in the case that the image input pattern is the 4:4:4 pattern. The method of determining Tu and Tv is differently defined according to the image input pattern. For example, in the case of the 4:2:0 pattern that components of one u and one v is combined with four Y components, four Tu values are defined to one u component when the above formulas (3) and (4) are applied. (The same is the case of the v component.) In such a case, the minimum value among the four Tu values are determined to be the value of Tu.

In the error generation process (step 43), the frame pattern of the original image is determined (step 431). In case of the interframe, the predictive error image (e) is defined (step 433) by receiving the predictive image (p) formed by the method for estimating and compensating the movement and the original image (O) as shown in the above formula (1). Meanwhile, in the case of the intraframe which cannot form the predictive image due to the absence of the movement vector, the predictive error image (e) is defined (step 435) using the standard pixels (my, mu, and mv) of the respective coding images. That is, the method of defining the predictive error image (e) with respect to the intraframe is described with regard to the case of coding the image of N×M pixel size by using the macroblock of 16×16 size as a coding image unit.

First, the standard pixel values my(i,j), mu(i,j), and mv(i, v) are defined with respect to each of the (N/16)*(M/16) macroblocks. At this time, i is larger than or equal to 0 and smaller than or equal to (N\16) and j is larger than or equal to 0 and smaller than or equal to (M\16).

Secondly, the difference between the standard pixel values and the respective pixels are defined as the error images (e) as shown in the formula (5).

$$ey=Oy(x,y)-my(i,j)$$

$$eu=Ou(x,y)-mu(i,j)$$

$$ev=Ov(x,y)-mv(i,j) \qquad (5)$$

Meanwhile, using the standard pixel values of the coding image units to define the error image (e) of the intraframe has an advantage in that a higher correlation between the image data than that in the case of a small dispersion degree between the image data is obtained.

In the process (step 45) of determining the perceptual error, the respective color component errors (ey, eu and ev) generated in the error generation process (step 43) are compared with the sizes (Ty, Tu, and Tv) of the color component allowable perceptual color differences (steps 451, 454 and 457). The color component allowable perceptual color differences (Ty, Tu, and Tv) are defined in the perceptual color difference determination process (step 41) to determine whether the respective color component errors (ey, eu, and ev) are distinguishable by the human eye.

When the size of the error is larger than the allowable perceptual color difference, in other words, it can be distinguishable by the human eye, the error value is retained as a perceptual error (steps 452, 455, and 458). Meanwhile, when the size of the error is smaller than or equal to the allowable perceptual color difference, in other words, the same can be distinguishable by the human eye, a perceptual error image (S) composed of only the errors generating the actual perceptual color difference is defined (step 460) by substituting the error value by 0 (steps 454, 456, and 459), to remove the error.

Figure 5A:
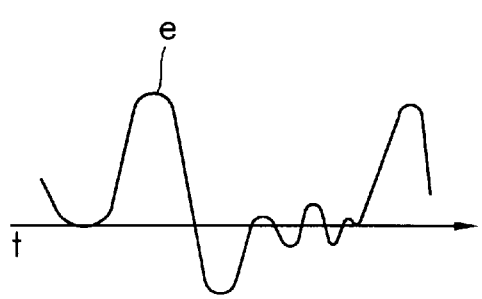
FIGS. 5A and 5B are graphical views showing an effect of removing a perceptual error.
Figure 5B:
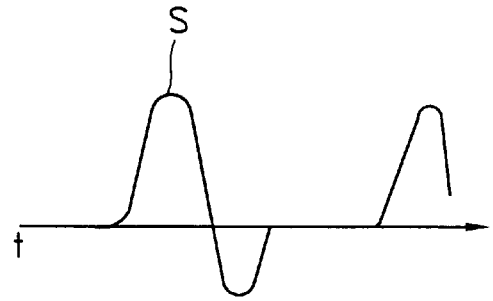

FIG. 5A shows the error image data (e) when the perceptual error processing portion 39 is not included in the previous image coding device and FIG. 5B shows the error image data (S) when the former is included in the latter.

As described above, according to the present invention, the perceptual color difference processing method, the image coding method, and the corresponding device improve the image coding efficiency by enhancing the temporal and spatial correlation between the image data without causing deterioration of restored image through the application of the human color perception to the conventional image coding method.

Also, it has an advantage of improving the efficiency of an operation since an additional processing time of the operation is not required when applying human color perception embodied in the look-up table to the image coding method.

Also, the present invention can be applied to the interframe and the intraframe which have movements in forming the perceptual error image by substituting the predictive error which does not generate the perceptual color difference by zero and can be compatibly applied to the conventional image coding method.

What is claimed is:

1. An image coding device, comprising:

means for generating a predictive error image from the difference between an original image of a present frame to be coded and a restored image of a previous frame;

means for coding said predictive error image through discrete cosine transform and quantization;

means for forming said predictive error image which was coded into a bitstream after performing variable length coding;

means for decoding said coded predictive error image through inverse quantization and inverse discrete cosine transform;

means for predicting the restored image of the previous frame by estimating and compensating a movement from said decoded predictive error image; and a perceptual error processing portion which reconstructs said predictive error image into a perceptual error image composed of only a predictive error generating a perceptual color difference using a perceptual color difference look-up table, and applies the reconstructed result to said coding means.

2. An image coding device, comprising:

means for generating a predictive error image from the difference between an original image of a present frame to be coded and a restored image of a previous frame;

means for coding said predictive error image through discrete cosine transform and quantization;

means for forming said predictive error image which was coded into a bitstream after performing variable length coding;

means for decoding said coded Predictive error image through inverse quantization and inverse discrete cosine transform;

means for predicting the restored image of the previous frame by estimating and compensating a movement from said decoded predictive error image; and a perceptual error processing Portion which reconstructs said Predictive error image into a Perceptual error image composed of only a Predictive error generating a perceptual color difference using a perceptual color difference look-up table, and applies the reconstructed result to said coding means, said perceptual error processing portion further comprising:

(a) a perceptual color difference determination portion for determining the sizes of allowable perceptual color differences of the respective image pixels of an original image to be coded using a perceptual color difference look-up table;

(b) an error generation portion for defining a predictive error using standard pixel values of the respective coding image units in case of an intraframe and defining a predictive error using the difference between a predictive error predicted by estimating and compensating a movement and said original image in case of an interframe; and (c) a visual error determination portion for comparing the sizes of the allowable perceptual color differences of the respective image pixels determined in said perceptual color difference determination portion and those of the predictive errors of image pixels of the respective frame patterns generated in said error generation portion and determining a perceptual error image composed of only an error generating the perceptual color difference.

3. An image coding device as claimed in claim 2, wherein said perceptual color difference look-up table is formed by determining the sizes of the allowable perceptual color differences of the respective color components (L, a and b) by applying a color measurement committee (CMC) perceptual color difference formula in a CIE L*a*b* uniform perceptual color coordinate system and converting the sizes of the allowable visual color differences defined in said CIE L*a*b* color coordinate system into a YUV color coordinate system.

4. An image coding device as claimed in claim 3, wherein a corresponding error value is substituted by 0 in case that the size of said predictive error is smaller than or identical to that of the allowable perceptual color difference in said perceptual error processing portion.

5. A perceptual error processing method, comprising the steps of:

generating a predictive error image from the difference between an original image of a present frame to be coded and a restored image of a previous frame;

coding said predictive error image through discrete cosine transform and quantization;

forming said predictive error image which was coded into a bitstream after performing variable length coding;

decoding said coded predictive error image through inverse quantization and inverse discrete cosine transform;

predicting the restored image of the previous frame by estimating and compensating a movement from said decoded predictive error image; and reconstructing said predictive error image into a perceptual error image composed of only a predictive error generating a perceptual color difference using a perceptual color difference look-up table, and applying the reconstructed result in said coding step, determining the sizes of allowable perceptual color differences of respective image pixels of an original image to be coded by using a perceptual color difference look-up table;

defining a predictive error using standard pixel values of respective coding image units in case of an intraframe, and defining the predictive error using the difference between a predictive image which is predicted by estimating and compensating a movement and said original image in case of an interframe; and determining a perceptual error image composed of the predictive error which generates a perceptual color difference, by comparing the determined sizes of allowable perceptual color differences of the respective image pixels with the defined predictive errors of respective image pixels.

6. A perceptual error processing method as claimed in claim 5, further comprising the step of forming said perceptual color difference look-up table by determining the sizes of allowable perceptual color differences of the respective color components (L, a and b) by applying a color measurement committee (CMC) perceptual color difference formula in a CIE L*a*b uniform perceptual color coordinate system and converting the sizes of allowable perceptual color differences defined in said CIE L*a*b color coordinate system into a YUV color coordinate system, and storing the converted sizes in said look-up table.

7. A perceptual error processing method as claimed in claim 6, wherein, when the size of said predictive error is smaller than or equal to that of the allowable perceptual color difference, the value of said error is substituted by 0.

* * * * *